(12) United States Patent
Simizu et al.

(10) Patent No.: US 11,936,246 B2
(45) Date of Patent: Mar. 19, 2024

(54) AXIAL FLUX MOTOR

(71) Applicant: Carnegie Mellon University, Pittsburgh, PA (US)

(72) Inventors: Satoru Simizu, Pittsburgh, PA (US); Paul Richard Ohodnicki, Jr., Allison Park, PA (US); Michael Edward McHenry, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 16/733,593

(22) Filed: Jan. 3, 2020

(65) Prior Publication Data
US 2021/0211007 A1    Jul. 8, 2021

Related U.S. Application Data

(60) Provisional application No. 62/766,825, filed on Nov. 5, 2018.

(51) Int. Cl.
*H02K 1/02* (2006.01)
*H02K 1/2796* (2022.01)
*H02K 3/12* (2006.01)
*H02K 19/10* (2006.01)
*H02K 21/44* (2006.01)

(52) U.S. Cl.
CPC ............. *H02K 1/2796* (2022.01); *H02K 1/02* (2013.01); *H02K 3/12* (2013.01); *H02K 19/10* (2013.01); *H02K 21/44* (2013.01)

(58) Field of Classification Search
CPC ........ H02K 1/2793; H02K 3/12; H02K 19/10; H02K 1/08; H02K 1/16; H02K 1/17; H02K 1/24; H02K 3/18; H02K 16/02; H02K 16/04; H02K 21/04; H02K 17/12; H02K 21/026; H02K 1/02
See application file for complete search history.

(56) References Cited

U.S. PATENT DOCUMENTS

| | | | | |
|---|---|---|---|---|
| 5,982,070 A | * | 11/1999 | Caamano | H02K 1/185 |
| | | | | 310/43 |
| 2016/0056671 A1 | * | 2/2016 | Atkinson | H02K 1/145 |
| | | | | 310/44 |
| 2017/0141631 A1 | * | 5/2017 | Tutunaru | H02K 1/02 |

(Continued)

FOREIGN PATENT DOCUMENTS

| | | | |
|---|---|---|---|
| CN | 101299560 A | * 11/2008 | |
| WO | WO-2018107078 A1 | * 6/2018 | ............ B32B 15/011 |

OTHER PUBLICATIONS

Lin, Machine Translation of CN101299560, Nov. 2008 (Year: 2008).*

(Continued)

*Primary Examiner* — Eric Johnson
(74) *Attorney, Agent, or Firm* — The Webb Law Firm

(57) ABSTRACT

Provided is an axial flux motor including a rotor having a wound ribbon core, the wound ribbon core including a metal amorphous nanocomposite material. The axial flux motor further includes a stator assembly spaced apart from the rotor along a rotation axis of the rotor. The stator assembly includes a body including a metal amorphous nanocomposite material and a plurality of permanent magnets substantially free of rare-earth materials. The plurality of permanent magnets is arranged on the body of the stator assembly.

15 Claims, 4 Drawing Sheets

(56) References Cited

U.S. PATENT DOCUMENTS

| | | | |
|---|---|---|---|
| 2017/0198701 A1* | 7/2017 | Sarlioglu | H02K 16/00 |
| 2017/0323712 A1* | 11/2017 | Yoshizawa | C22C 38/14 |
| 2019/0368013 A1 | 12/2019 | Aronhime et al. | |

OTHER PUBLICATIONS

Arakawa et al., "Examination of an Interior Permanent Magnet Type Axial Gap Motor for the Hybrid Electric Vehicle," IEEE Transactions on Magnetics, Oct. 2011, pp. 3602-3605, vol. 47, No. 10.

Arkkio, "Analysis of Induction Motors Based on the Numerical Solution of the Magnetic Field and Circuit Equations," Electrical Engineering Series, 1987, pp. 1-97, No. 59, Acta Polytechnica Scandinavica.

Aronhime et al., "Magnetic Properties and Crystallization Kinetics of (Fe100-xNix)80Nb4Si2B14 Metal Amorphous Nanocomposites," 2017, pp. 1-8.

Aronhime et al., "The Effects of Strain-Annealing on Tuning Permeability and Lowering Losses in Fe—Ni based Metal Amorphous Nanocomposites," 2017, pp. 1-11.

Aydin et al., "Torque Quality and Comparison of Internal and External Rotor Axial Flux Surface-Magnet Disc Machines," 2006, pp. 1-7.

Degeorge et al., "Time temperature transformation diagram for secondary crystal products of Co-based Co—Fe—B—Si—Nb—Mn soft magnetic nanocomposite," Journal of Applied Physics, 2015, pp. 1-4, vol. 117.

Eggert et al., "Rare Earths: Market Disruption, Innovation, and Global Supply Chains," Annual Review of Environment and Resources, 2016, pp. 199-222, vol. 41.

Kurniawan et al., "Alloy substituents for cost reduction in soft magnetic materials," Journal of Materials Research, Apr. 2015, pp. 1-6.

Kurniawan et al., "Effect of alloy substituents on soft magnetic properties and economics of Fe-based and Co-based alloys," Journal of Materials Research, Jul. 2015, pp. 1-7.

Leary et al., "Stress induced anisotropy in Co-rich magnetic nanocomposites for inductive applications," Journal of Materials Research, Oct. 28, 2016, pp. 3089-3107, vol. 31, No. 20.

Ohodnicki Jr. et al., "Phase evolution and field-induced magnetic anisotropy of the nanocomposite three-phase fcc, hcp, and amorphous soft magnetic alloy Co89Zr7B4," Journal of Applied Physics, 2008, pp. 1-3, vol. 103.

Simizu et al., "Metal Amorphous Nanocomposite (MANC) Soft Magnetic Material (SMM) Enabled High Power Density, Rare Earth Free Rotational Machines," 2018, pp. 1-13.

Silveyra et al., "High speed electric motors based on high performance novel soft magnets," Journal of Applied Physics, 2014, pp. 1-3, vol. 115.

Silveyra et al., "Amorphous and Nanocomposite Materials for Energy-Efficient Electric Motors," Journal of Electronic Materials, Aug. 14, 2015, pp. 219-225, vol. 45, No. 1.

Steinmetz, "On the Law of Hysterisis," Proceedings of the IEEE, Feb. 1984, pp. 197-222, vol. 72, No. 2.

Taguchi et al., "High Energy Ferrite Magnets," Journal de Physique IV Proceedings, Mar. 1997, pp. 1-2, vol. 07.

Takata, "Permanent Magnet Properties and Microstructures of Chill-Cast (Ce-MM)—Cu—Co Ternary Alloys," 1973, pp. 477-482.

Widmer et al., "Electric vehicle traction motors without rare earth magnets," Sustainable Materials and Technologies, Mar. 7, 2015, pp. 7-13, vol. 3.

Zhu et al., "Analysis of Electromagnetic Performance of Flux-Switching Permanent-Magnet Machines by Nonlinear Adaptive Lumped Parameter Magnetic Circuit Model," IEEE Transactions on Magnetics, Nov. 2005, pp. 4277-4287, vol. 41, No. 11.

Aronhime, "Development of Fe—Ni based Metal Amorphous Nanocomposites for Electric Motor Applications", Carnegie Mellon University, Aug. 2018.

\* cited by examiner

AXIAL FLUX MOTOR

CROSS-REFERENCE TO RELATED APPLICATION

This application claims priority to U.S. Provisional Patent Application No. 62/766,825, filed Nov. 5, 2018, the disclosure of which is hereby incorporated by reference in its entirety.

GOVERNMENT LICENSE RIGHTS

This invention was made with Government support under DE-EE0007867 awarded by the Department of Energy. The Government has certain rights in the invention.

BACKGROUND

1. Field

This disclosure relates generally to axial flux motors.

2. Technical Considerations

High-efficiency motors may utilize permanent magnets to create a constant magnetic field within the motor. These magnets are often rare-earth permanent magnets due to the particularly strong magnetic field created by such magnets. Rare-earth magnets, such as NdFeB magnets, have historically been incorporated in high-efficiency high-power density motor designs with success. However, there has been a growing need to prevent over reliance on rare-earth elements, including their use in magnets. Increasing costs of rare-earth elements, environmental concerns with the use and mining of rare-earth elements, and locations of rare-earth deposits result in a need to use alternative materials in magnets to reduce the dependence on rare-earth elements. However, the use of non-rare-earth permanent magnets results in lower energy, putting such materials at a disadvantage to traditional rare-earth magnets.

Zhu et al. (Z. Q. Zhu, Y. Pang, D. Howe, S. Iwasaki, R. Deodhar, and A. Pride, "Analysis of electromagnetic performance of flux-switching permanent magnet Machines by nonlinear adaptive lumped parameter magnetic circuit model," IEEE Trans. Magn., vol. 41, no. 11, pp. 4277-4287, November 2005) discloses a flux-switching permanent magnet machine with a doubly salient stator and rotor topology. The examined design is for a relatively small three-phase synchronous control motor with a low mechanical speed (400 W at 400 rpm). At higher speeds, the amount of power loss in the soft magnetic materials of the machine increases. The amount of power loss becomes a greater concern when using rare-earth free permanent magnets due to the lower magnetic strength. One type of soft magnetic material used in axial flux motor designs is 3% silicon steel. However, the use of 3% silicon steel with rare-earth free permanent magnets may result in a power loss that renders the motor too inefficient for practical use. The power loss in the soft magnetic material may include losses through hysteresis losses, eddy current losses, and excess losses. A new soft magnetic material is needed to decrease the power loss for a sustainable motor design.

SUMMARY

Non-limiting embodiments of the present disclosure are directed to an axial flux motor. In some non-limiting embodiments, the axial flux motor may include a rotor including a wound ribbon core. The wound ribbon core may include a metal amorphous nanocomposite material. The motor may further include a stator assembly spaced apart from the rotor along a rotation axis of the rotor. The stator assembly may include a body including a metal amorphous nanocomposite material and a plurality of permanent magnets substantially free of rare-earth materials. The plurality of permanent magnets may be arranged on the body.

In some non-limiting embodiments, the rotor may include a FeNi compound.

In some non-limiting embodiments, the plurality of permanent magnets may include at least six permanent magnets.

In some non-limiting embodiments, the stator assembly may include a three-phase stator assembly.

In some non-limiting embodiments, the stator assembly may include a number of slots, the number of slots being a multiple of six.

In some non-limiting embodiments, the number of slots may selected from a group consisting of 6, 12, 18, and 24.

In some non-limiting embodiments, a coil may be wound around a permanent magnet of the plurality of permanent magnets and each slot of the stator assembly.

In some non-limiting embodiments, the rotor may have a number of poles, a ratio of the number of poles of the rotor to the number of slots of the stator assembly being selected from a group consisting of 2:3, 5:6, 7:6, and 4:3.

In some non-limiting embodiments, the number of slots in the stator assembly may be 12 and the number of poles of the rotor may be selected from a group consisting of 8, 10, 14, and 16.

In some non-limiting embodiments, the stator assembly may include a first stator spaced apart from a first side of the rotor and a second stator spaced apart from a second side of the rotor.

In some non-limiting embodiments, the rotor may include a first rotor arranged on a first side of the stator assembly and a second rotor arranged on a second side of the stator assembly. The first rotor and the second rotor may be connected via a shaft.

In some non-limiting embodiments, the axial flux motor may further include a housing. The stator assembly may be fixed to the housing and the rotor may be rotatable relative to the housing.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION OF THE PREFERRED EMBODIMENTS

Figure 1:
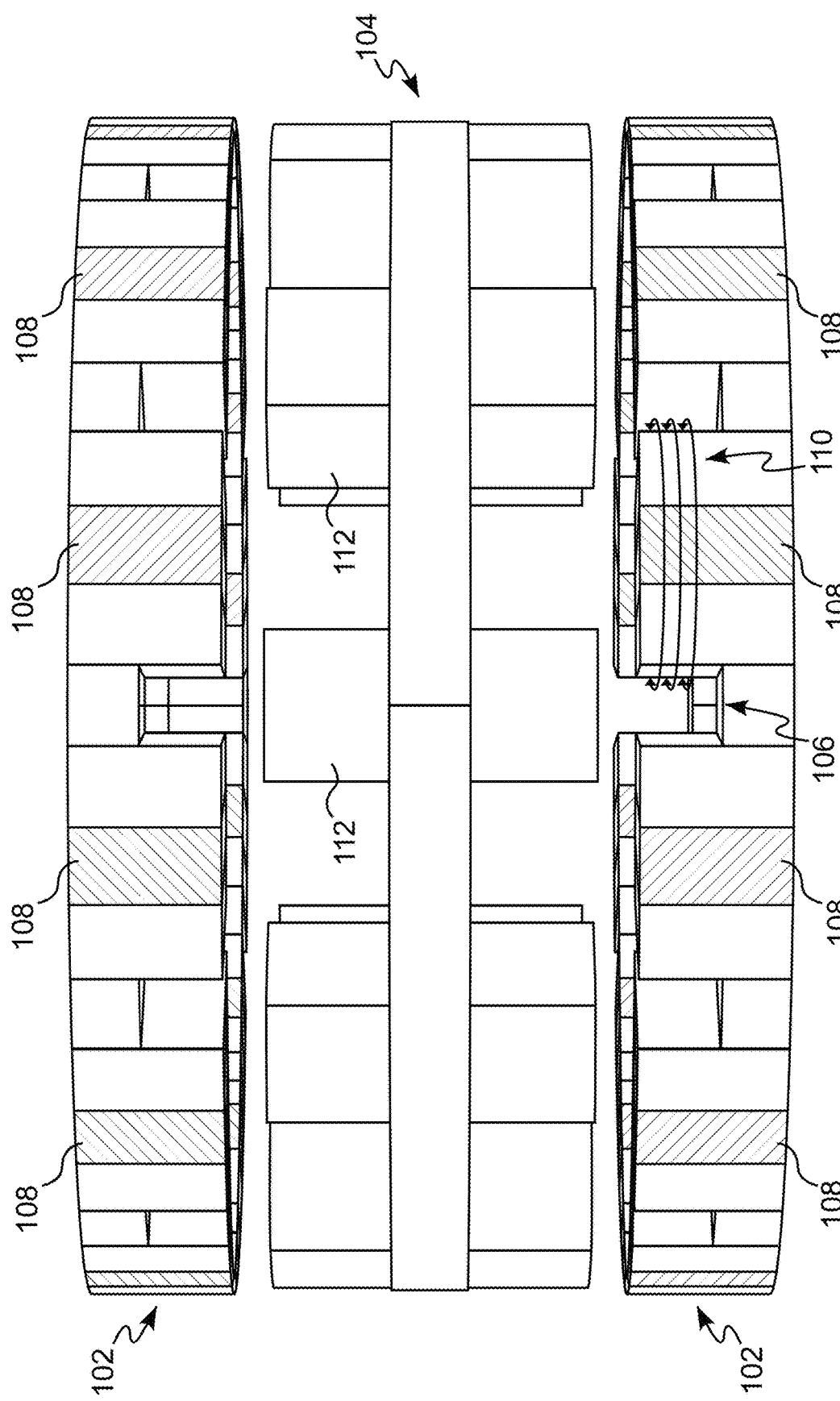
FIG. 1 is a schematic diagram of a stator and rotor arrangement of an axial flux motor according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

All numbers used in the specification and claims are to be understood as being modified in all instances by the term "about." The terms "approximately," "about," and "substantially" mean a range of plus or minus ten percent of the stated value.

As used herein, the term "metal amorphous nanocomposite material" (MANC) refers to soft magnetic materials (SMMs) featuring low power loss at high frequency and maintaining relatively high flux density. MANCs have metastable nanocomposite structures, which may remain stable to several 100° C. without deleterious secondary crystallization. As an example, a MANC may include a FeNi-based composition. A MANC may include a Cobalt (Co)-based composition. Suitable materials are described in U.S. Patent Application Publication No. 2019/0368013 (application Ser. No. 16/434,869), titled "Fe—Ni Nanocomposite Alloys," the entirety of which is hereby incorporated by reference.

As used herein, a magnetic material that is "substantially free of rare-earth materials" means that the magnetic material includes less than 2% by weight of rare-earth materials. The magnetic material may also be free of rare-earth materials. As used herein, "free of rare-earth materials" means that rare-earth materials are not present in the magnetic material or that rare-earth materials are present in the magnetic material in only incidental and/or trace amounts, such as less than 0.2% by weight, less than 0.1%, 0%, etc.

Referring to FIG. 1, a view of an axial flux motor 100 is shown according to a non-limiting embodiment. The motor 100 as shown is a dual stator motor although it will be appreciated that other arrangements are possible. For example, two rotors may be arranged around a single stator, such that one rotor is on each side of the stator. In another example, a single rotor and a single stator may be arranged, although the force between the rotor and stator acting parallel to the rotational axis in such embodiments may be countered with, for example, a thrust bearing. In the dual stator arrangement shown in FIG. 1, the magnetic forces between the two stators 102 and the rotor 104 are balanced, thereby causing the rotor to be axially suspended between the two stators 102.

Figure 2:
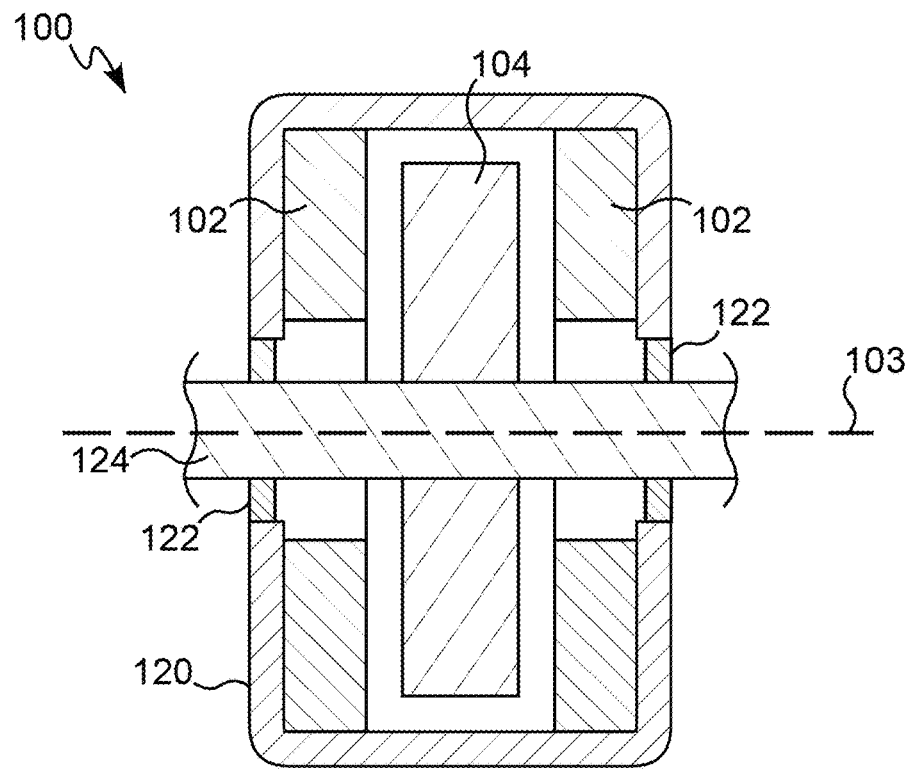
FIG. 2 is a side cross-sectional schematic diagram of an axial flux motor according to a non-limiting embodiment, including the stator and rotor arrangement of FIG. 1.

The axial flux motor 100 shown in FIG. 1 has a single rotor 104 surrounded by two stators 102. The stators 102 may be rigidly mounted to a housing 120, as shown in FIG. 2. The rotor 104 is rotatable relative to the stators 102 about a rotation axis 103. In non-limiting embodiments, the rotor 104 may be radially supported by one or more radial bearings 122 mounted to the housing 120. In non-limiting embodiments, the rotor 104 may be mounted to a shaft 124 coaxial with the rotation axis 103 of the rotor 104. The rotor 104 may be axially spaced apart from the stators 102 along the rotation axis 103, such that an air gap is present between the rotor 104 and the stators 102. A larger air gap may reduce cogging torque. The magnetic force exerted in the axial direction by each stator 102 balances the rotor 104 between the stators. FIG. 2 is a side cross-sectional schematic diagram of the stator and rotor arrangement of FIG. 1 according to a non-limiting embodiment.

Figure 3:
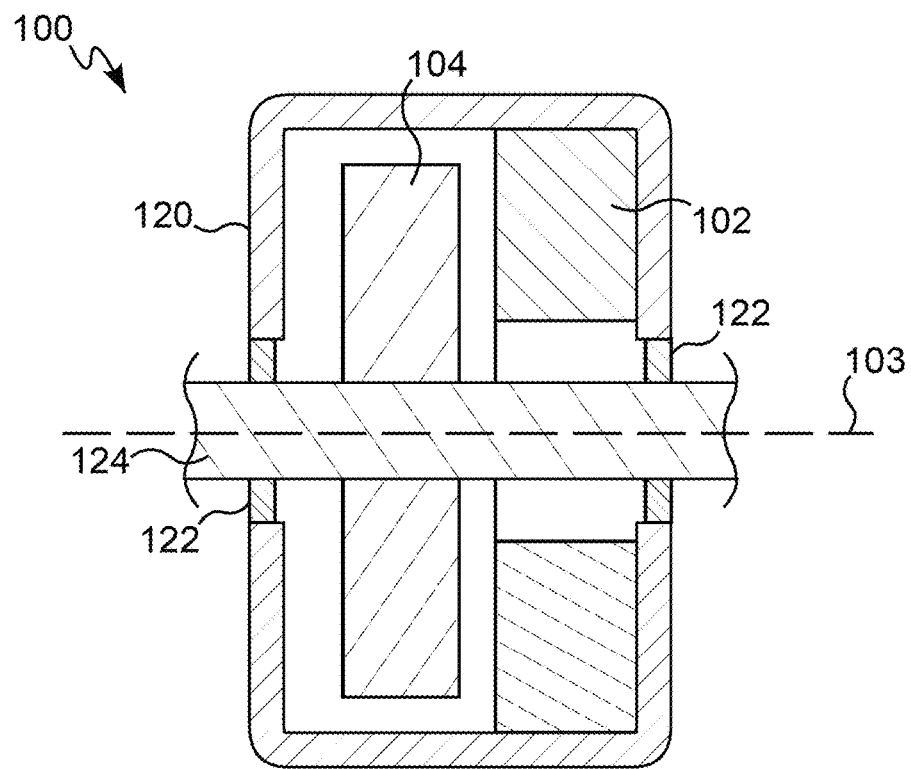
FIG. 3 is a side cross-sectional schematic diagram of an axial flux motor according to another non-limiting embodiment.
Figure 4:
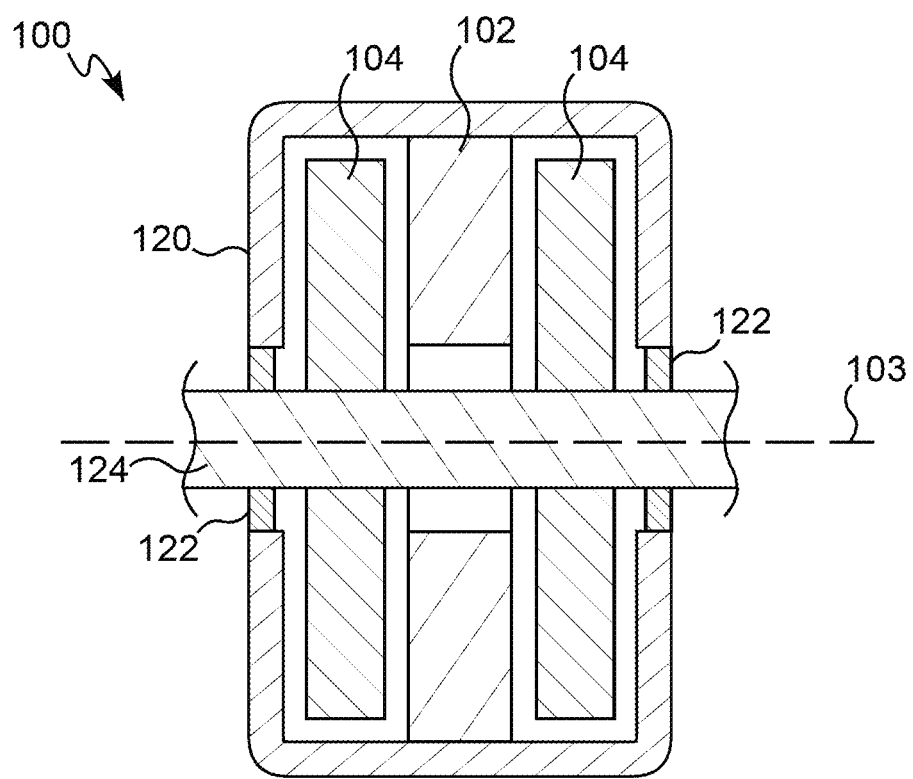
FIG. 4 is a side cross-sectional schematic diagram of an axial flux motor according to another non-limiting embodiment.

Other arrangements of the motor 100 are shown in FIGS. 3 and 4. In the non-limiting embodiment shown in FIG. 3, the motor 100 includes a single stator 102 and a single rotor 104. In this arrangement, the magnetic force exerted by the stator 102 on the rotor 104 may induce the rotor 102 to move in an axial direction relative to the stator 102. To prevent such axial movement of the rotor 104 and to maintain the intended air gap, a thrust bearing may be employed to support the rotor 104 and/or the shaft 124 relative to the housing 120. In the embodiment shown in FIG. 3, one or both of the radial bearings 122 may serve as a thrust bearing supporting the shaft 124 in an axial direction.

Another non-limiting embodiment is shown in FIG. 4, in which the motor 100 includes two rotors 104 arranged on opposite sides of a single stator 102. The magnetic force exerted in the axial direction by the stator 102 against each rotor 104 balances the rotors 104 on either side of the stator 102.

With continued reference to the non-limiting embodiment shown in FIG. 1, a plurality of poles 112 is arranged around the circumference of the rotor 104. In the dual stator 102 embodiment shown, a plurality of poles 112 is arranged on each side of the rotor 104, such that at least one pole of the plurality of poles 112 faces each stator 102. Each stator 102 includes a plurality of slots 106 arranged around the circumference of the stator 102. A plurality of permanent magnets 108 is also arranged around the circumference of each stator 102. Each permanent magnet 108 of the plurality of permanent magnets 108 may be arranged between two of the plurality of slots 106 in a circumferential direction of the stator 102, with the magnetic polarity of each permanent magnet 108 aligned with the circumferential direction and in an alternating direction with the magnetic polarity of the neighboring permanent magnets 108. A winding 110 may be provided around each permanent magnet 108 (only a single winding 110 around a single magnet is illustrated in FIG. 1 for clarity). The winding 110 associated with each permanent magnet 108 may pass through the two slots 106 located on either side of that permanent magnet 108.

In non-limiting embodiments, the windings 110 may be electrically connected to a motor controller including a power source (not shown) for inducing an electrical current through the windings 110. The electrical current generates a magnetic field that increases the magnetic flux of the plurality of permanent magnets 108. The motor controller may be configured to drive current through each winding 110 in a predetermined sequence, such that a magnetic flux from the permanent magnet 108 is directed toward rotor poles 112 crossing the air gap, enhancing and closing the flux loop. The attracting force between rotor poles 112 and stators 102 causes the rotor 104 to rotate about the rotation axis 103 relative to the stators 102.

Having generally described the arrangement and operating principle of the motor 100 with respect to the non-limiting embodiment shown in FIG. 1, the individual components thereof will now be described in detail. The rotor 104 may be a hollow cylindrical structure with the plurality of poles 112 projecting axially therefrom. In some non-limiting embodiments, the rotor 104 may be formed of, or may include, a wound ribbon core of a soft magnetic material. In some non-limiting embodiments, the soft magnetic material (SMM) may be, or may include, a MANC. In some non-limiting embodiments, the MANC may be, or may include, a FeNi-based composition. In some non-limiting embodiments, the core may be wound from a ribbon of a MANC having a width of, for example, between about 25 millimeters (mm) and about 50 mm, and a thickness of, for example, about 20 micrometers (μm). In some non-limiting embodiments, the core may be wound from a wider ribbon of a MANC. Suitable materials for non-limiting embodiments of the rotor 104 are described in U.S. Patent Application Publication No. 2019/0368013, the entirety of which is hereby incorporated by reference.

In some non-limiting embodiments, each of the plurality of poles 112 may be formed by machining the core of the rotor 104. Each of the plurality of poles 112 may be a salient pole. In contrast to a conventional rotor in which permanent magnets are used at the poles, the plurality of poles 112 of the rotor 104 of the present disclosure may exhibit no polarity as a consequence of being formed of a SMM. The number of poles 112 in the plurality of poles 112 may be selected to optimize the power, efficiency, and/or mechanical properties of the motor in conjunction with the number of slots 106 of the stator 102. Maximum torque output of the motor 100 generally increases proportionally to the number of poles 112. However, due to constraints on the design of the motor 100, such as manufacturing capabilities, power loss, reduction in flux linkage, and/or cogging torque, the number of poles 112 may be limited to optimize desired electromechanical characteristics of the motor 100 in view of manufacturing considerations. Additional detail as to the number of poles 112 of the rotor will be discussed herein in connection with the slots 106.

In some non-limiting embodiments, each of the stators 102 may be a three-phase stator, such that the windings 110 are provided with alternating current (AC) in three offset phases. In some non-limiting embodiments, each stator 102 may include a body formed of, or including, a wound ribbon core of a soft magnetic material. The use of soft magnetic material for both the stators 102 and the rotors 104 reduces the power loss of the motor. In some non-limiting embodiments, the soft magnetic material may be, or may include, a MANC. In some non-limiting embodiments, the soft magnetic material may be, or may include, a FeNi-based composition. In some non-limiting embodiments, the core may be wound from a ribbon of a MANC having a width of, for example, between about 25 millimeters (mm) and about 50 mm, and a thickness of, for example, about 20 micrometers (μm). Suitable materials for the stators 102 are described in U.S. Patent Application Publication No. 2019/0368013, the entirety of which is hereby incorporated by reference.

In some non-limiting embodiments, each of the plurality of slots 106 may be formed by machining the body of the stator 102. The number of slots 106 in the plurality of slots 106 may be selected to optimize the power, efficiency, and/or mechanical properties of the motor in conjunction with the number of poles 112 of the rotor 104. In some non-limiting embodiments, the number of slots 106 may be selected from a group consisting of multiples of six, such as a group consisting of 6, 12, 18, and 24. The number of permanent magnets 108 in each stator 102 may be equal to the number of slots 106 in each stator 102.

In some non-limiting embodiments, the ratio of the number of poles 112 on the rotor 104 to slots 106 of each stator 102 may selected from a group consisting of 2:3, 5:6, 7:6, and 4:3. For example, for a stator 102 having twelve slots 106, the number of poles 112 of the rotor 104 may be selected from groups consisting of 8 (for a ratio of 2:3), 10 (for a ratio of 5:6), 14 (for a ratio of 7:6), and 16 (for a ratio of 4:3) when the motor 100 is configured for operation as a three-phase motor. It is noted that the foregoing ratios describe the number of slots 106 in each stator and the number of poles 112 of the rotor 104 facing that stator 102. For the dual stator 102 embodiment shown in FIG. 1, the number of poles 112 referred to above indicates the poles 112 on one side of the rotor 104. Thus, if each stator 102 has twelve slots 106 and the ratio of poles 112 to slots 106 is 5:6, each side of the rotor 104 has ten poles 112. It will be appreciated that other arrangements are possible.

With permanent magnet motors, the torque is typically proportional to the current and does not depend on the rotational speed. Thus, the power of the motor increases proportionally to the rotational speed of the motor. As the motor speed increases, the voltage that appears on the coil (back-emf) increases proportionately. The maximum speed of the motor is typically set by the maximum available voltage from the power supply. It is therefore difficult for a permanent magnet motor to modify this behavior because the magnetic flux comes mostly from the permanent magnet.

Figure 5A:
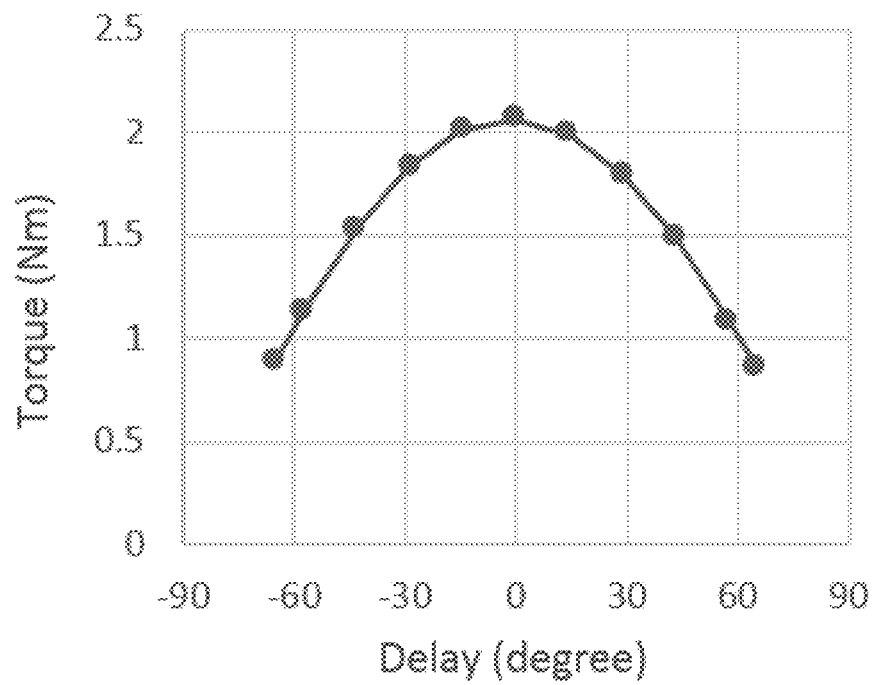
FIG. 5A is a chart showing torque and delay of the sinusoidal current in a non-limiting embodiment.
Figure 5B:
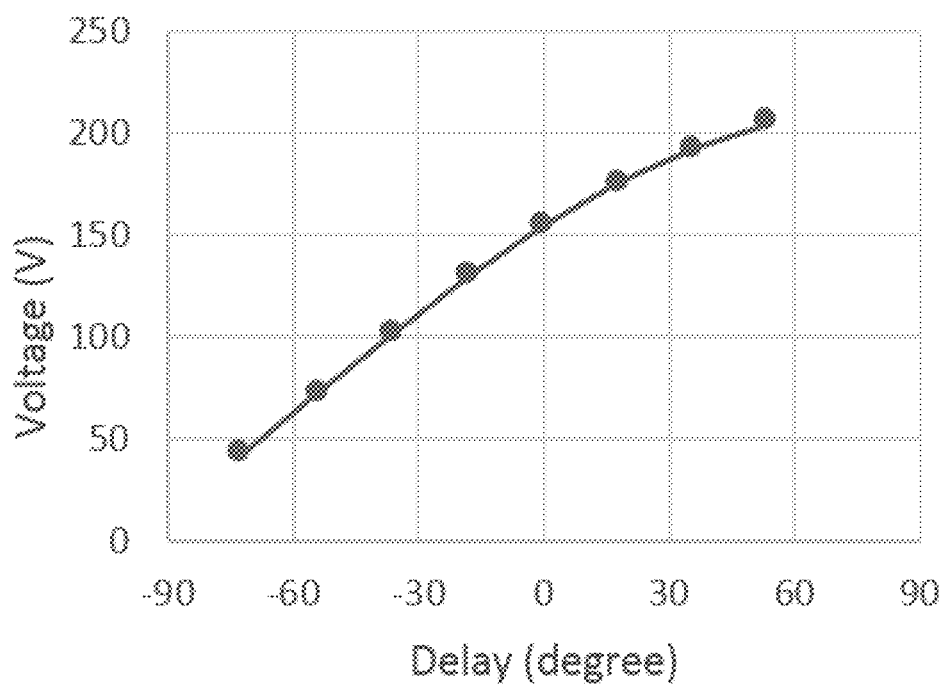
FIG. 5B is a chart showing voltage and delay of the back-emf in a non-limiting embodiment.

In non-limiting embodiments of an axial flux motor, the flux patterns from the permanent magnet and the current are both sinusoidal. Since the flux linkage is sinusoidal, the back-emf is also sinusoidal. A constant torque is obtained by arranging a three-phase coil system in which the electrical drive system provides sinusoidal current that matches in phase with the sinusoidal back-emf. When this phase is delayed or advanced, the generated torque falls off as shown in FIG. 5A. The amplitude of the back-emf changes by the application of the sinusoidal current as shown in FIG. 5B. When the current is delayed with respect to that of the back-emf (e.g., when the current is off), the amplitude of the back-emf increases. When the current phase is advanced, the back-emf amplitude decreases. By advancing the current phase, the motor speed may be increased without increasing the voltage of the power supply.

The use of MANCs in the stator and rotors may result in significant decreases in the overall power loss of the motor 100 compared to other SMMs. For example, in a non-limiting embodiment of an axial dual stator motor design, a motor 100 configured for operation as a three-phase motor may have 14 rotor poles 112 and 12 stator slots 106. The stators 102 and rotor 104 may have an outer radius of about 70 mm and an inner radius of about 30 mm. The air gap between the stators 102 and rotor 104 may be about 1 mm. With a voltage of 166 V, 7.5 A, and power of 2.5 kW, the use of 3% silicon steel as the SMM may result in a power loss of 133 W. However, if a Fe—Ni MANC is used as the SMM, the power loss may instead be about 3.4 W. The use of MANCs may also result in significant decreases in the temperature rise of the SMM. In the current example non-limiting embodiment, the use of 3% silicon steel may result in a material temperature rise of 190° C. without active cooling, while the use of a Fe—Ni MANC may see a temperature increase of only 42° C. without active cooling. It will be appreciated that numerous other measurements, power levels, materials, and temperatures may be used.

Although non-limiting embodiments have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An axial flux motor comprising:
    a rotor comprising a wound ribbon core, the wound ribbon core comprising a metal amorphous nanocomposite material without secondary crystallization; and
    a stator assembly spaced apart from the rotor along a rotation axis of the rotor, the stator assembly comprising:
        at least one second wound ribbon core comprising a metal amorphous nanocomposite material without secondary crystallization; and
        a plurality of permanent magnets substantially free of rare-earth materials, the plurality of permanent magnets arranged on the at least one second wound ribbon core.

2. The axial flux motor of claim 1, wherein the rotor comprises a FeNi compound.

3. The axial flux motor of claim 1, wherein the plurality of permanent magnets comprises at least six permanent magnets.

4. The axial flux motor of claim 1, wherein the stator assembly comprises a three-phase stator assembly.

5. The axial flux motor of claim 4, wherein the stator assembly comprises a number of slots, the number of slots being a multiple of six.

6. The axial flux motor of claim 5, wherein the number of slots is selected from a group consisting of 6, 12, 18, and 24.

7. The axial flux motor of claim 5, wherein a coil is wound around a permanent magnet of the plurality of permanent magnets and each slot of the stator assembly.

8. The axial flux motor of claim 1, wherein the rotor has a number of poles, a ratio of the number of poles of the rotor to the number of slots of the stator assembly selected from a group consisting of 2:3, 5:6, 7:6, and 4:3.

9. The axial flux motor of claim 8, wherein the number of slots in the stator assembly is 12 and the number of poles of the rotor is selected from a group consisting of 8, 10, 14, and 16.

10. The axial flux motor of claim 1, wherein the stator assembly comprises:
    a first stator spaced apart from a first side of the rotor; and
    a second stator spaced apart from a second side of the rotor.

11. The axial flux motor of claim 1, wherein the rotor comprises:
    a first rotor arranged on a first side of the stator assembly; and
    a second rotor arranged on a second side of the stator assembly,
    wherein the first rotor and the second rotor are connected via a shaft.

12. The axial flux motor of claim 1, further comprising a housing, the stator assembly being fixed to the housing and the rotor being rotatable relative to the housing.

13. The axial flux motor of claim 1, wherein the metal amorphous nanocomposite material comprises a Fe-Ni compound comprising 20-80% Ni.

14. The axial flux motor of claim 1, wherein the rotor has a number of poles formed of the amorphous nanocomposite materials such that the poles exhibit no polarity.

15. The axial flux motor of claim 1, wherein the wound ribbon core and/or the second wound ribbon core comprises a ribbon of a FeNi compound, the ribbon having a width of from 25 mm to 50 mm.

* * * * *